United States Patent Office 3,373,607
Patented Mar. 19, 1968

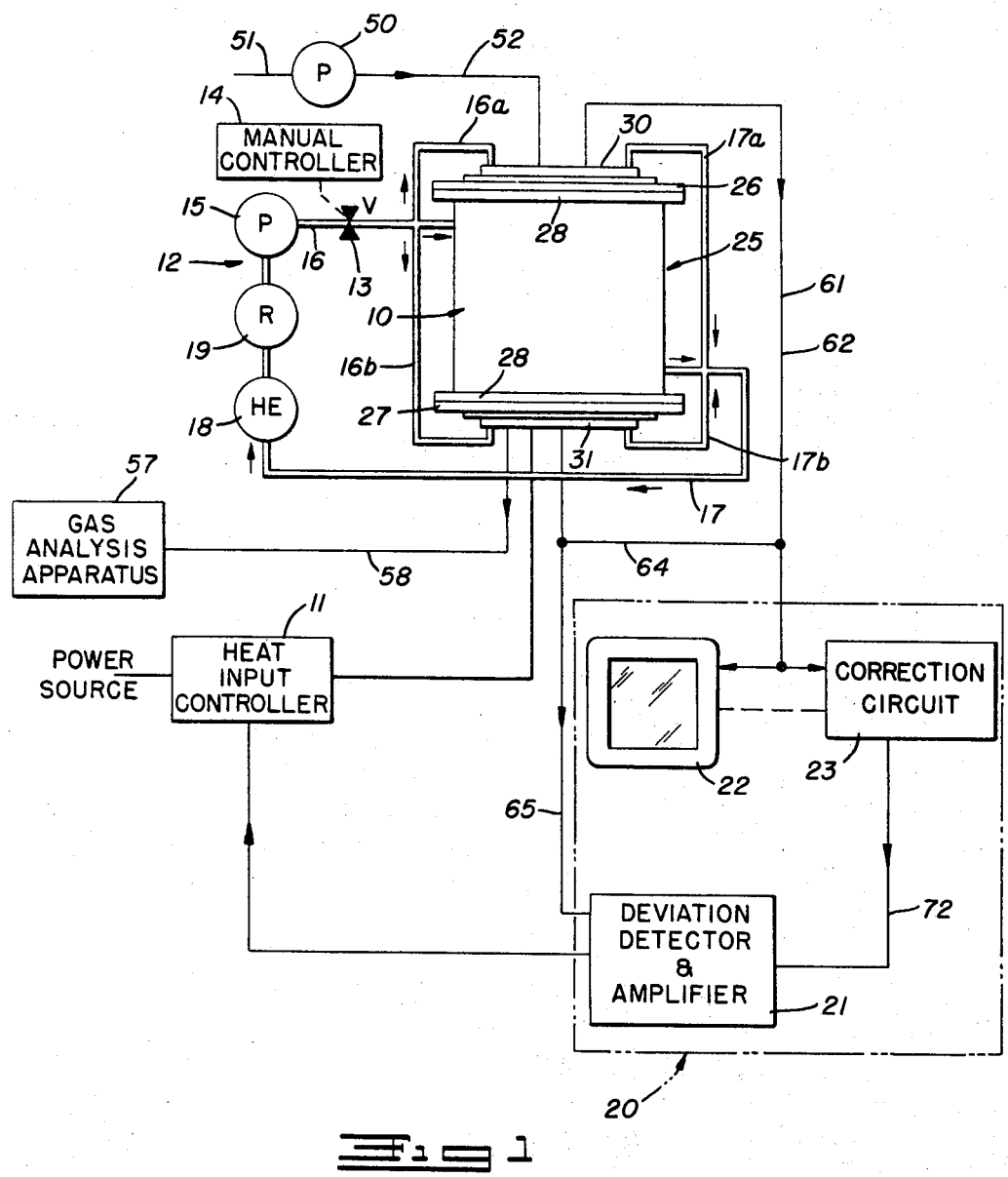

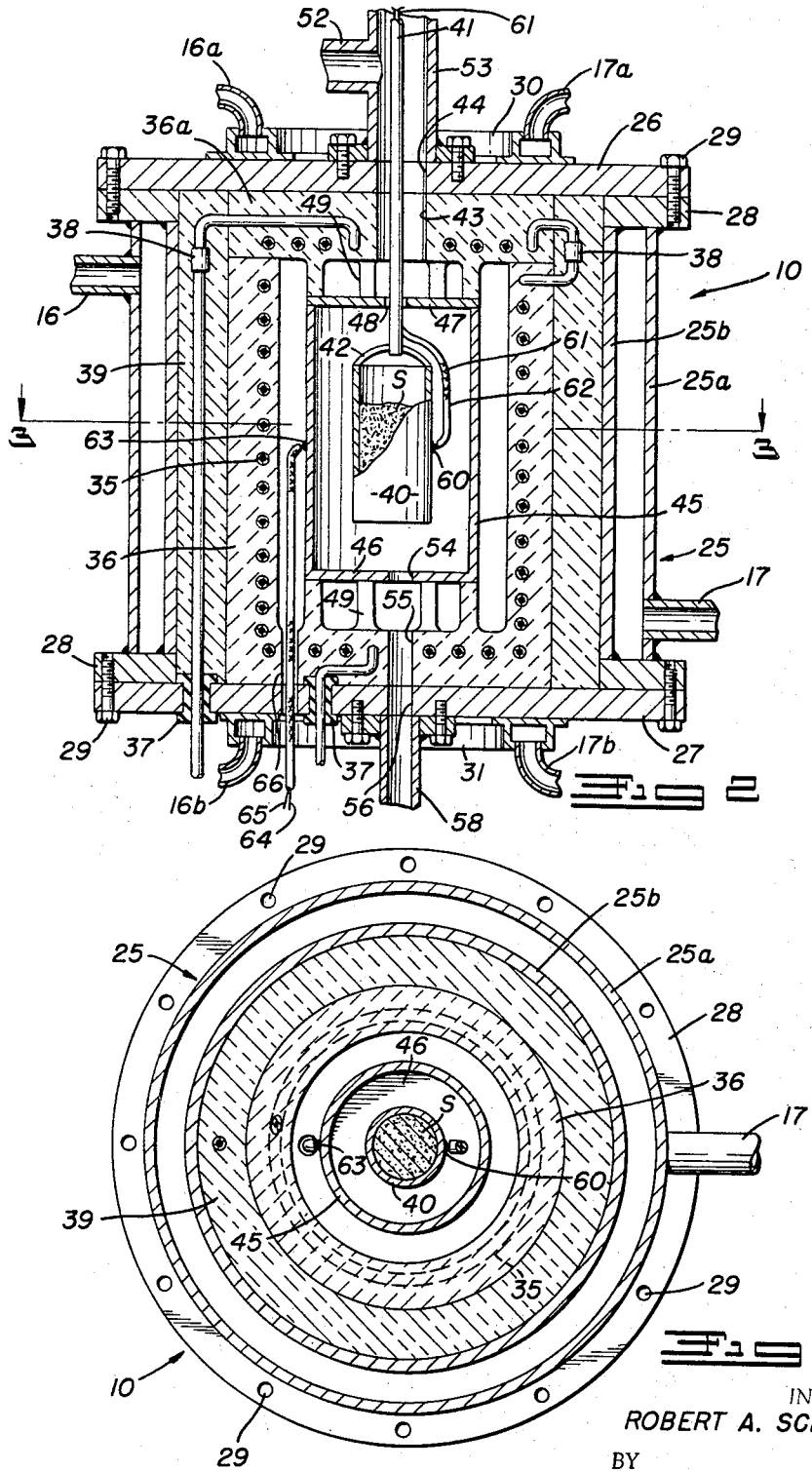

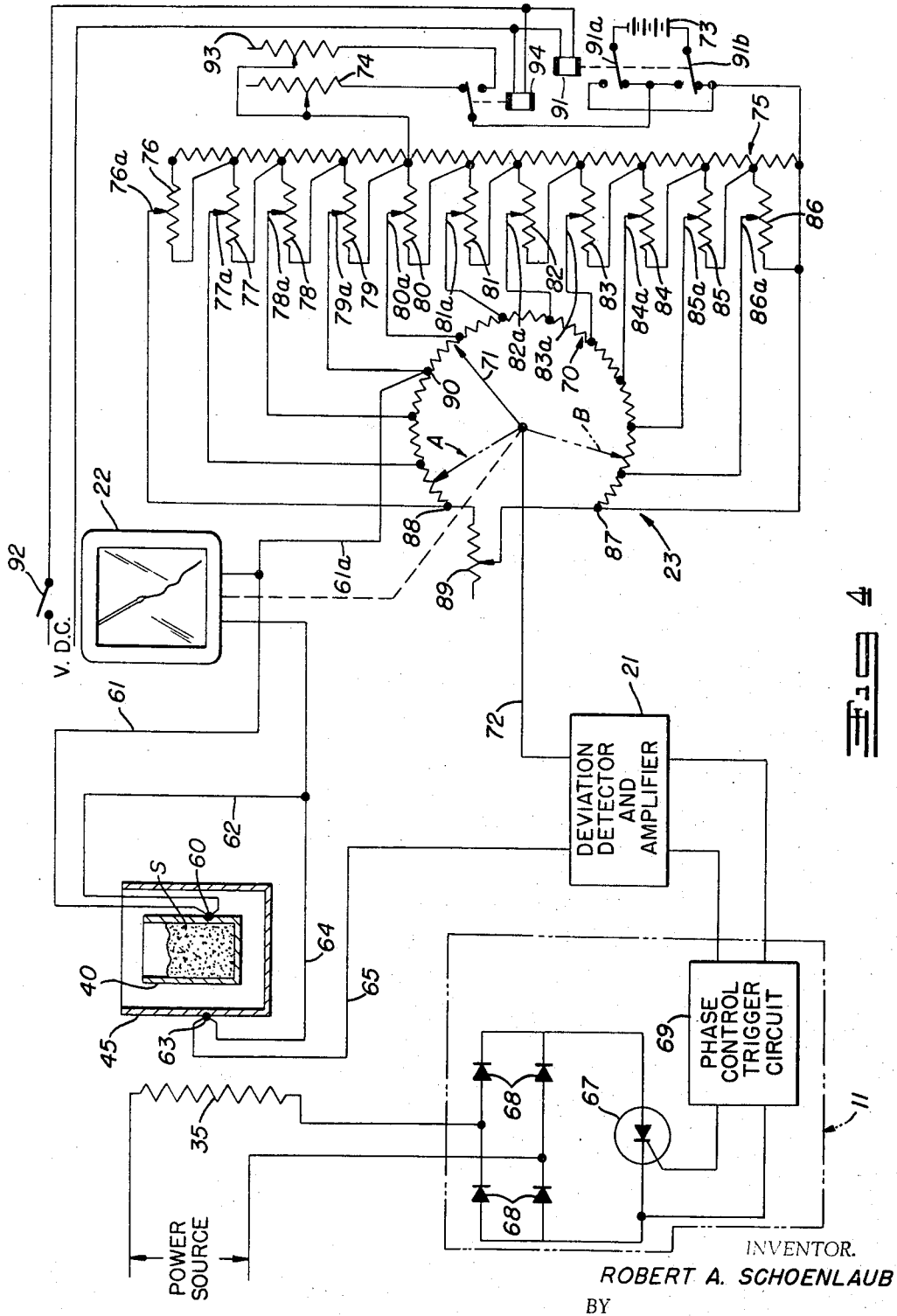

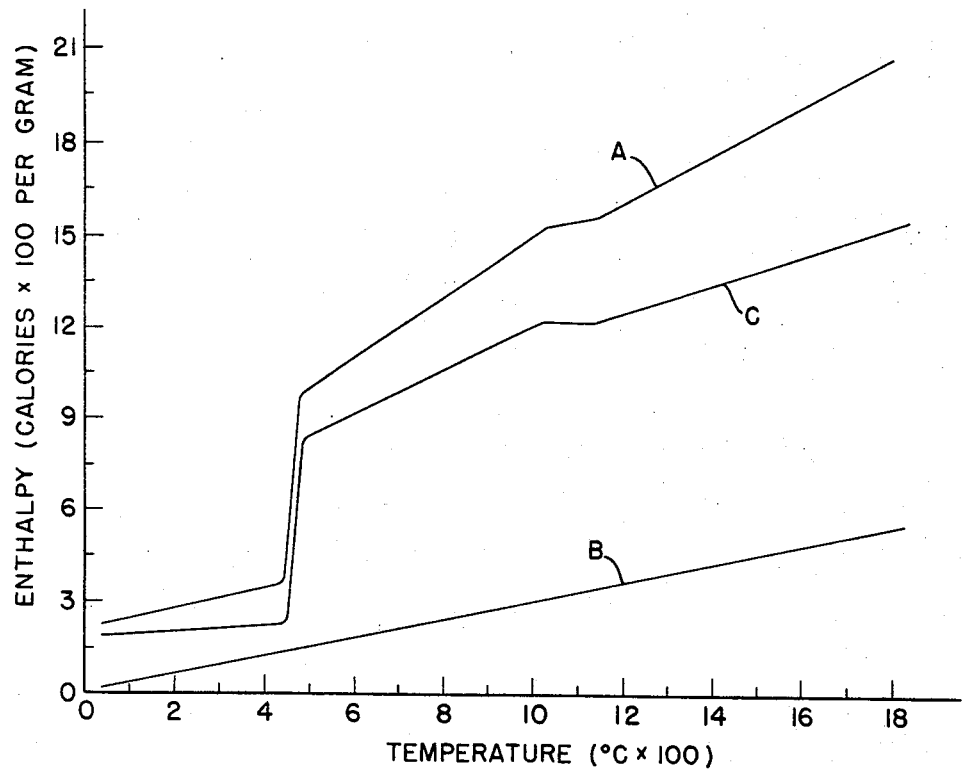

3,373,607
CALORIMETER APPARATUS AND METHOD OF DIRECTLY DETERMINING ENTHALPY
Robert A. Schoenlaub, Columbus, Ohio, assignor to Harrop Precision Furnace Company, a division of Harrop Ceramic Service Co., Columbus, Ohio, a corporation of Ohio
Filed Jan. 29, 1965, Ser. No. 430,512
9 Claims. (Cl. 73—190)

ABSTRACT OF THE DISCLOSURE

Direct determination of enthalpy is effected by calorimetric apparatus which maintains a constant rate of heat transfer over an extended temperature range. The constant rate of heat transfer is electrically controlled by means of an electronic circuit which compares an actual temperature differential in the heat transfer elements of the calorimetric apparatus with a predetermined desired temperature differential and applies any detected difference to apparatus controlling the rate of heat transfer.

*General description of enthalpy measurement*

In accordance with prior practice, the determination of enthalpy has been accomplished by either the well known method of mixtures or the relatively complex technique of differential thermal analysis. While each of the methods has been extensively utilized in testing applications with reasonably effective results, each has several disadvantages which have led to the present invention. With respect to the method of mixtures, a large number of tests are required to provide data at the necessary number of distinct temperature points. Reasonable accuracy in the results requires the precise measurement of temperature necessitating the utilization of costly equipment. Even with the relatively precise temperature measurements possible with suitable equipment, this method is inherently incapable of determining small changes in enthalpy at high temperatures since the error in temperature measurement often completely masks a change in enthalpy such as may result from an inversion.

The differential thermal analysis technique requires costly and complex electronic apparatus for precise control of temperature in a predetermined program and for detection and recording of microvolt signals. Secondly, the heating rate must be relatively rapid with a linear characteristic and is, therefore, difficult to utilize in conjunction with other test measurement procedures such as weight or length. Quantitative results are not accurately obtained through differential thermal analysis because of uncontrollable factors such as density of packing, thermal conductivity, or shrinkage during sintering or melting affect the final result.

The disadvantages of the two prior practice methods have been substantially eliminated through utilization of the method and the calorimetric apparatus for the practice of the method provided by this invention. This invention provides for the direct determination of enthalpy through a novel calorimetric furnace and control apparatus.

It is, therefore, the primary objective of this invention to provide a calorimetric apparatus for performing direct quantitative thermal analysis of an unknown test sample.

It is also an important object of this invention to provide a method of directly determining the enthalpy of an unknown test sample.

It is another object of this invention to provide a calorimetric apparatus for direct quantitative thermal analysis which maintains a constant rate heat transfer with an unknown sample over an extended temperature range for determination of enthalpy.

It is a further object of this invention to provide a calorimetric apparatus for direct enthalpy measurements in which the rate of test performance may be varied for compatibility with other related test operations such as thermal gravimetric analysis, gas analysis of effluent and dilatometry.

It is also an object of this invention to provide a calorimetric apparatus for determination of enthalpy which is of low cost construction and which, through direct measurement, is simple to operate and does not require extensive, complex calibration.

These and other objects and advantages of this invention will be readily apparent from the following detailed description of an embodiment thereof and the accompanying drawings.

In the drawings:

FIGURE 1 is a diagrammatic representation of a calorimetric apparatus embodying this invention.

FIGURE 2 is a vertical, medial sectional view of a calorimeter furnace of the calorimetric apparatus.

FIGURE 3 is a horizontal, medial sectional view taken along line 3—3 of FIGURE 2.

FIGURE 4 is a schematic diagram of the electrical circuit of the apparatus.

FIGURE 5 is a graphic representation of the enthalpy determination for a specific material.

Having reference to the drawings, a calorimetric apparatus embodying the invention is diagrammatically illustrated in FIGURE 1. The apparatus comprises a calorimetric furnace 10, shown in further detail in FIGURES 2 and 3, which includes heat transfer means of novel construction facilitating a constant rate of heat transfer relative to the sample of material being tested in accordance with this invention. The range of temperatures within which enthalpy measurements may be desired may extend substantially below an ambient temperature as well as above and the illustrated furnace is provided with means for selectively increasing or decreasing the temperature relative to the ambient as well as controlling the direction of heat transfer. Means for addition of heat to and means for removal of heat from the material sample are accordingly incorporated in the furnace with each means being provided with appropriate control apparatus for maintaining the rate of heat transfer constant in accordance with this invention. The heat additive means, in this embodiment, comprises an electrical resistance element (not shown in FIGURE 1) with its respective control apparatus 11 being a suitable electric power circuit controller which is responsive to a control signal.

Means for the removal of heat or the lowering of the furnace and sample temperature to below ambient is designated generally at 12 in FIGURE 1 and may comprise a closed circuit, fluid coolant system of conventional construction. Control of the coolant system is effected by a suitable valve mechanism 13 interposed in the system which may be operated by a manual controller 14 that is also responsive to a control signal. Forming a part of the fluid coolant system 12 is a fluid circulating pump 15 that may be electrically driven and includes necessary and appropriate well known controls for its operation. The outlet passage of the pump 15 is connected to a heat exchanger incorporated in the calorimeter furnace 10, described in further detail hereinafter, by a fluid conduit 16 in which the valve mechanism 13 is interposed. Another fluid conduit 17 connects with the furnace heat exchanger and the pump inlet passage providing a fluid return. Interposed in the return conduit 17 is an external heat exchanged 18 for removing heat from the fluid coolant and a receiver 19. A suitable fluid would be selected for the coolant system, such as liquid nitrogen or helium, which would be compatible with the selected operating temperature range.

For tests where the sample is to be cooled from an elevated temperature, the coolant system would normally be placed in operation and the heat additive means operated to maintain a constant rate of heat transfer. Similarly, if the test requires the sample to be cooled to temperatures substantially below ambient before increase to a specified elevated temperature, the coolant system would first be operated to effect the necessary reduction in temperature and the heat additive means then operated to elevate the temperature through a constant rate of heat transfer.

An appropriate control signal is provided by a novel control system which is designated generally by the numeral 20 in FIGURE 1. The control system includes an electronic detector and amplifier 21, a temperature indicator 22 which includes a visual-type continuous recording mechanism and correction circuit means 23. In the illustrated embodiment, the temperature indicator 22 is mechanically coupled to the correction circuit to provide an input signal. An electrical input signal for operation of the temperature indicator 22 is provided by temperature responsive means disposed within the calorimetric furnace 10 and indicative of the temperature of the sample of material. The correction circuit 23 is also referenced to the temperature responsive means and is operative to provide a predetermined input signal to the deviation detector and amplifier 21 which signal is a selected function of the sample temperature. A second temperature responsive means also disposed within the furnace 10 is indicative of the temperature of the heat transfer means and connects with the deviation detector and amplifier 21. The first and second temperature responsive means are electrically interconnected whereby the actual signal provided is a differential signal and the deviation detector is operative to compare this differential temperature signal with the signal provided by the correction circuit with a resultant control signal being selectively supplied to either the heat input controller 11 or the servo-controller 14, as the case may be. The specific components of the control system 20 and the associated control and controlled elements will be further described and an illustrative operation example for the apparatus will be briefly outlined for demonstrating the advantages thereof.

A typical construction of a calorimetric furnace 10 embodying the princples of this invention is illustrated in detail in FIGURES 2 and 3. The furnace is constructed with a rigid outer shell comprising a double-walled cylinder 25 and end closure plates 26 and 27 which are removably attached to the cylinder 25. The concentric, spaced apart walls 25a and 25b of the cylinder 25 are sealed at each end as by bolt rings 28 and form a heat exchanger through which a fluid coolant may be circulated. Fluid coolant inlet and outlet conduits 16 and 17 are attached to the outer wall 25a of the cylinder 25 for connection with the fluid coolant system 12. Each end closure plate 26 and 27 is removably attached to its respective bolt ring 28 by the cap screws 29 and is preferably provided with a heat exchanger connectable in circuit with the coolant system 12. Each of the latter heat exchangers may comprise a circularly-shaped tube, 30 and 31, which is secured to the exterior face of the respective closure plates 26 and 27. Each tube, 30 and 31, is concentrically disposed relative to its respective plate, 26 and 27, for uniform heat transfer and is provided with coolant inlet conduits 16a and 16b and outlet conduits 17a and 17b which are connected to the respective main coolant conduits 16 and 17.

Positioned interiorly of the cylinder 25 is a heating element 35 which, in the present embodiment, comprises a resistance-type, electrical heating element. Supporting the heating element 35 is a refractory material constructed in the form of a substantially closed cylinder 36 having one end wall 36a adapted to be readily removable. The heating element 35 is embedded in the refractory cylinder 36 in uniformly distributed shell-form adjacent the interior surfaces thereof. The heating element is helically wound in the cylindrical wall portion while being spirally wound in a flat plane in each of the end walls. The two terminal ends of the heating element 35 are brought out of the refractory cylinder 36 and the furnace shell and project through apertures formed in the end closure plate 27 and provided with suitable bushings 37. To facilitate removal of the end wall 36a of the refractory cylinder 36, the portion of the heating element 35 embedded therein has the terminal end portions brought out and provided with suitable connectors 38 for connection with the remaining portions of the heating element.

The refractory cylinder 36 is concentrically disposed within the furnace shell with the ends thereof in contacting engagement with the inner surfaces of the end closure plates 26 and 27. Thus, the removable end 36a will be maintained in closing relationship to the main cylindrical portion of the refractory cylinder 36 when the furnace shell is assembled. In the illustrated embodiment, the refractory cylinder 36 is substantially smaller in diameter than the inner wall 25b of the furnace shell cylinder and the annular, cylindrical space therebetween may be filled with a suitable heat insulating material 39, as illustrated. Rapid temperature changes may occur during a test operation and is is desirable that the control system be capable of following the temperature change with equal rapidity. Response of the control system is enhanced through minimization of the refractory and insulation material although the structural limitations must also be considered in the furnace construction.

A sample container 40 which is adapted to receive a quantity of the material S to be tested is centrally positionable within the refractory cylinder 36. The sample container 40 is of typical construction being an open top, thin-walled cylindrical tube fabricated from a suitable material such as platinum. Means for centrally supporting the container 40 may comprise an elongated ceramic rod 41 attached by suitable connecting means 42 to the container and extending vertically upward through the top of the furnace to a fixed support (not shown). Aligned openings 43 and 44 are formed in the removable end 36a of the refractory cylinder and the end closure plate 26 through which the rod 41 extends and also provide means for exhausing any gases that may be evolved through heating of the sample. It has been found advantageous to utilize a ceramic rod for testing applications where heat is continuously added over the temperature range of the test although this is not considered as a limitation on the construction. Other materials may also be utilized and, in particular, platinum wire has been found advantageous in tests where heat is removed from the furnace at a predetermined rate.

Performance of the enthalpy tests in accordance with this invention requires a constant rate of heat transfer and must include means for effecting control over the transfer of heat. This is accomplished through the inclusion of a shield 45 in the heat transfer means for providing a body having a substantially uniform temperature which surrounds the sample container 40. Heat is transferred to or from the sample container 40 by a shield 45 comprising a thin-walled, cylindrical tube having end walls 46 and 47. One end wall 47 is removable from the tube 45 to permit positioning of the container 40 interiorly of the shield and an aperture 48 is formed in the end wall for passage of the ceramic rod 41. The shield is of a shape similar to the sample container 40, although proportionally larger, with the interior wall surfaces being generally equidistantly spaced from the surfaces of the container to further enhance the substantially constant rate of heat transfer. A number of upstanding projections 49 are formed on the inwardly facing surfaces of the end walls of the refractory cylinder to engage the ends of the shield and maintain the shield in fixed, spaced relationship to the inner walls of the refractory cylinder 36. Through appropriate dimensioning of the shield and the refractory cylinder 36, the shield may be maintained at a temperature relative to the sample container 40 so as to effect an efficient transfer of heat therebetween. Utilization of a material for the fabrication of the shield which has suitable heat conduction and radiation characteristics for the specific application, such as platinum, will result in the uniform transfer of heat at a predetermined constant rate.

The rate of heat transfer between the shield 45 and the sample container is also dependent on the heat transfer characteristics, and other factors, of the gases which occupy the intervening space. Assuming the presence of a standard atmosphere within the furnace, the rate of heat transfer may be precisely controlled through consideration of the standardized test conditions. However, during the process of heating the sample undergoing a test, gases are evolved which contaminate a standard atmosphere that may have existed and may introduce error in the test results as the instantaneous atmosphere could not be continuously monitored to permit appropriate compensation of the control system. Any error which could result from the evolvement of foreign gases may be substantially eliminated in the present apparatus by a gaseous effluent removal system. This system comprises a fluid pump 50 (see FIGURE 1), which may be of the electrically-driven type provided with suitable controls, not shown, connected with the furnace 10 for removing the gaseous effluent by the continuous circulation therethrough of a substantially standard atmosphere. The inlet passage 51 of the pump 50 is open to a suitable source and the discharge passage thereof is connected by a conduit 52 to the furnace 10. A flanged connector 53 (formed with a central passageway) is bolted to the exterior of the end closure plate 26 with the passageway being aligned with the apertures 43 and 44. The conduit 52 is tapped into the connector 53 which may also be utilized to support the ceramic rod 41 carrying the sample container 40.

Exhaust of the gases from the furnace 10, and particularly from within the shield 45, is effected through an aperture 54 formed in the end wall 46 of the shield and the aligned apertures 55 and 56 formed in the lower end wall of the refractory cylinder 36 and the end closure plate 27. The gases may be exhausted to the atmosphere or, if desired, they may be routed through a suitable, well known analysis apparatus. Such an apparatus, designated by the numeral 57, is diagrammatically indicated in FIGURE 1 and connected to the furnace by a conduit 58 having a flanged terminal end adapted to be bolted to the exterior of the end closure plate 27. The gas analysis may thus be conducted simultaneously with the enthalpy determination and provide additional test data as to the effluent such as the conductivity and density thereof.

An electrical input signal for operation of the temperature indicator 22 is provided by a temperature responsive means comprising a thermally-responsive electric element 60 attached to the sample container 40 (see FIGURES 2, 3 and 4). The leads 61 and 62 attached to the element 60 are carried out of the furnace 10 through any suitable means and are connected to the temperature indicator 22 which is preferably of the strip chart type. To provide insulation for the leads 61 and 62, the ceramic rod 41 is preferably of tubular construction and the leads are disposed within the rod. The element 60 is shown in FIGURE 2 as attached to the exterior wall of the container 40 at approximately the mid point thereof. The location of the connection in a particular case would depend on the amount of material in the container with the connection being made at a point substantially below the upper surface of the material for accurate temperature measurement. The second temperature responsive means also comprises a thermally-responsive electric element 63 which is attached to the shield 45 of the heat transfer means. Both thermally-responsive elements 60 and 63 comprise well known thermocouples which are of a type selected for their compatible temperature characteristics in a specific application. A pair of leads 64 and 65 attached to the element 63 are carried out of the furnace through a passage 66 formed in the bottom of the furnace (see FIGURE 2) with lead 64 being tapped into lead 62. The other lead 65 is connected to the deviation detector and amplifier 21 with the two elements 60 and 63 being electrically interconnected to provide a differential signal which is proportional to the temperature differential between the container 40 and the heat transfer shield 45.

As previously indicated, the deviation detector 21 utilizing conventional circuitry compares this temperature differential signal with a second input signal which is provided by the correction circuit 23. The resultant signal output is also amplified by the amplifier section of the detector and amplifier 21 and forms the control signal for operation of the heat input controller 11.

The apparatus illustrated in FIGURE 4 is for a test operation where heat is to be added to the sample and the output of the deviation detector and amplifier 21 is accordingly connected with the heat input controller 11. For test operations where heat is to be removed from the sample S and container 40 at a constant rate, the output of the correction circuit 23 would be of reversed polarity to correspond with the polarity reversal of the temperature differential signal and the illustrated circuit is adapted to provide the reversed polarity signal.

The input heat controller 11 utilizes a phase controlled conduction circuit interposed in the electrical power source circuit to the heating element 35. In the present embodiment, an alternating current waveform type power source is utilized to permit control of the heat input through phase control of the electric current flowing through the heating element. Phase control is effected by a silicon-controlled rectifier 67 connected in circuit with the heating element 35 through a full-wave, bridge-rectifier circuit utilizing four semiconductor diodes 68. A gating signal for control of the rectifier 67 is provided by a phase-control trigger circuit 69 of well known construction which is connected to the output of the deviation detector and amplifier 21 and is responsive to the output signal thereof. The trigger circuit 69 is connected to the gating terminal of the rectifier 67 and is effective in controlling the conduction of the rectifier in response to the output signal of the detector and amplifier 21.

The principle of operation on which the present calorimetric apparatus is based is that by maintaining a predetermined, constant rate of heat transfer over a given time interval, it is possible to readily ascertain the enthalpy. The enthalpy will thus be a direct function of the time and it is, therefore, possible to directly determine the enthalpy. It is essential that the rate of heat transfer be maintained constant during the test operation and the precise control, in accordance with this invention, is effected through maintenance of a predetermined temperature differential between the heat transfer means and the sample. This predetermined temperature differential is initially established as a theoretical value utilizing standard "Tables of Enthalpy" with the theoretical value modified as necessary by a test calibration procedure. The temperature differential thus established is then utilized in construction of the correction circuit to obtain a desired temperature differential signal. In the present apparatus, the temperature differential is measured between the heat transfer shield 45 and the container 40. The container 40 is at substantially the same temperature as the sample S while the shield 45 forms a uniform temperature heat source. At any given temperature of the container 40, the shield 45 may be maintained at a determinable, dissimilar temperature such as to effect a given rate of heat transfer. The temperature differential necessary to maintain a constant rate of heat transfer over a wide range of temperatures does not remain constant and it is the function of the correction circuit 23 to provide a signal which is related to the temperature differential that is required at any given temperature. The deviation detector and amplifier 21 compares the measured temperature differential, as determined by the thermocouples 60 and 63, with the desired differential signal and provides a resultant control signal which effects any necessary change in the heating effect of the heating element 35.

The correction circuit 23 in the illustrated embodiment comprises a potentiometer apparatus which is operable to provide a specific voltage signal for a specific sample temperature. This specific voltage signal is related to the temperature differential required to maintain the desired rate of heat transfer at a given temperature and forms the input signal transmitted to the deavition detector 21 which is compared with the actual temperature differnetial as ascertained by the two thermocouples 60 and 63. The potentiometer apparatus includes a tapped slide-wire resistance 70 and movable arm contact 71 with the contact being electrically connected to the deviation detector 21 by a conductor 72. A mechanical interconnection between the arm 71 and the temperature indicator 22 effects movement of the contact about the resistance 70 in relationship to the temperature of the sample. A suitable constant voltage or constant current power source 73, such as a battery, is connected to the resistance 70 through a resistance network and a series connected adjusting resistor 74 to provide a voltage output signal for utilization by the deviation detector 21. The resistance network includes a multi-tapped resistance 75 having a relatively low total resistance and a number of independently and selectively operable potentiometers, 76–86, with each potentiometer being connected across a respective tapped section of the resistance. The movable contact of each potentiometer, 76–86, designated by the respective numeral with the subscript $a$, is connected to a tap of the resistance 70 with the respective tapped sections of the resistances 70 and 75 being sequentially arranged as indicated. The combined resistance of the potentiometers 76–86 and the slide-wire resistance 70 is relatively high and each of the potentiometers may be adjusted to obtain the desired voltage characteristic for the respective section without affecting the other sections. Further increasing the number of potentiometers and the taps in the slide-wire resistance 70 would also further increase the accuracy of the voltage characteristic that could be obtained. An end terminal 87 of the slide-wire resistance 70 is connnected to the positive terminal of the battery 73 along with an end terminal of the tapped resistance 75. The opposite end terminal 88 of the slide-wire resistance 70 is indirectly connected to the opposite end terminal of the tapped resistance 75 through the potentiometer 76. Connected across the end terminals 87 and 88 of the slide-wire resistance 70 is an adjustable calibration resistance 89. The negative terminal of the battery 73 is connected through the voltage adjusting resistor 74 to an intermediate tap of the resistance 75 which is associated with the potentiometer 79.

The temperature differential required to maintain a constant, predetermined rate of heat transfer over a given range of temperatures is not constant as it is a function of the emissivity characteristic of the shield material. In the case where the temperatures are increased above ambient, the required temperature differential has been found to decrease to a minimum value at an elevated temperature and to thereafter increase with a further increase in temperature. This requires a similar signal from the correction circuit 23 for transmittal to the deviation detector 21 and the potentiometer apparatus is accordingly connected and adjusted to provide a minimum signal. An intermediate terminal tap 90 of the slide-wire resistance 70, such as the tap connected to the movable contact 79a of potentiometer 79, is also connected by conduit 61a to the reference terminal of the temperature indicator 22 and the thermocouple 60 and thereby forms a minimum signal point. Displacement of the contact arm 71 to either side of tap 90 will provide an increase in the voltage signal input to the deviation detector 21 with the voltage signal characteristic being appropriately determined through adjustment of the potentiometers 76–86.

The specific resistance values of the several components of the correction circuit are determined by the particular furnace application and are selected to give the desired operation. Factors to be considered are the type of thermally-responsive elements utilized in ascertaining the temperature of the container 40 and of the shield 45 and the particular construction of the furnace 10 as the rate of heat transfer is affected by the construction. Thermocouple type temperature sensing elements are not linear over their entire range of operation and appropriate compensation must be incorporated in the correction circuit 23 to provide proper correlation of test data. The temperature differential characteristic for a specific constant rate of heat transfer for the addition of heat to a sample is not the same as the characteristic for removal of heat and this requires appropriate recalibration of the correction circuit or the interchange of specifically calibrated circuits for the particular test operation. The characteristic temperature differential in either instance may be determined by experimental techniques utilizing samples having known heat characteristics. Prior to performing a test on an unknown sample, the apparatus would be subjected to a calibration test utilizing a material having known characteristics to assure accuracy of results during subsequent testing.

The operation of the apparatus in the direct determination of enthalpy can best be illustrated with reference to FIGURES 4 and 5 in conjunction with the testing of an unknown sample. Prior to initiation of the test, a quantity of the sample material having a given weight would be placed in the sample container 40 and the container positioned within the furnace 10 as previously described. At the initiation of the test, the temperature of the sample would be at ambient or room temperature and the sample would have an initial enthalpy. This would not affect the testing as this initial enthalpy merely forms an assumed base or zero reading. However, the initial enthalpy is graphically represented in FIGURE 5 for illustrative purposes by the curves not terminating at the zero temperature and enthalpy point and thereby indicate an assumed enthalpy at a specific ambient temperature.

In this illustrative test procedure, the enthalpy of the sample S is to be increased over a predetermined temperature range having an upper limit of approximately 1800 degrees centigrade. Also for illustrative purposes, the enthalpy ordinate is assigned scalar quantities which are expressed in calories per gram. In the usual test, the sample S would comprise four grams of the material but the graph of FIGURE 5 has been constructed to provide a per unit weight example. This reduction to a per unit basis may be accomplished mathematically in the construction of the graph.

Assuming that the control system has been placed in operation and a suitable power source connected to the input heat controller 11 and the heating element 35, the apparatus will operate to furnish the desired enthalpy data. The thermocouples 60 and 63 will note a temperature of the container 40 and shield 45 and a related signal indicative of a temperature differential therebetween will be transmitted to the deviation detector and amplifier 21. Simultaneously, the temperature indicator 22 would be actuated to record the temperature of the container 40 and would displace the contact arm 71 to a position on the slide-wire resistance 70 related to that temperature. In the present example, it is assumed that the contact arm 71 would be displaced to the position designated A and an input signal indicative of the desired temperature differential for that specific temperature would be generated and transmitted to the deviation detector 21. The two input signals would be compared by the deviation detector and any deviation would form an output or control signal to be transmitted to the trigger circuit 69 of the input heat controller 11. Since at the initiation of the test the shield 45 and container 40 with the sample S would be at the same temperature, the thermocouples 60 and 63 would not transmit a temperature differential and there would be a control signal transmitted to the trigger circuit 69.

In response to the control signal, the trigger circuit 69 would cause the silicon-controlled-rectifier 67 to switch to a conducting state whereby a heating current would flow through heating element 35. The heating effect of the heating element 35 would, in turn, increase the temperature of the shield 45. An increase in the temperature of the shield 45 above the temperature of the container 40 will result in a transfer of heat to the container 40 with a consequent increase in the temperature of the container and the sample S. This transfer of heat to the container 40 and sample S will continue as long as a temperature differential exists between the shield 45 and the container 40 with a consequent increase in the enthalpy of the sample S.

An increase in the temperature of the container 40 will be noted by the temperature indicator 22 and will also effect a displacement of the contact arm 71. With increasing temperature, the contact arm 71 will be rotated in a clockwise direction providing a desired voltage signal for the specifiic temperature in accordance with the predetermined temperature differential characteristic of the apparatus. As previously explained, the temperature differential characteristic provides a constant rate of heat transfer and it is the function of the control system to maintain the predetermined temperature differential between the shield 45 and the container 40. After initiation of the test, the electric current flowing through the heating element 35 will continue to be regulated or controlled by the control 11 in response to the control signal to maintain the desired temperature differential for a constant rate of heat transfer.

The temperature indicator 22 comprising a strip chart recorder operates on a time basis with the temperature being recorded as a function of the time. Since the rate of heat transfer is maintained constant during a test operation, the time basis may be readily converted to an enthalpy basis as illustrated in FIGURE 5. As the test proceeds with a continuous addition of heat, the indicator 22 will be seen to provide a graphic representation of the enthalpy as related to the temperature. Clockwise rotation of the contact arm 71 from position A through the minimum signal point 90 and toward the elevated temperature position B will continue to provide a signal to the deviation detector 21 that is related to the required temperature differential for a constant rate of heat transfer and the controller 11 will respond accordingly.

By this method, the combined enthalpy of the container 40 and the sample will be determined directly as represented by curve A with a corresponding high resolution of the measurement. The container 40 is fabricated from a material having a known heat characteristic which is substantially linear over the operational temperature range and this characteristic may be graphically represented in FIGURE 5 by curve B. Through graphic elimination of the effect of curve B from curve A, a third curve C is obtained which represents the enthalpy of the sample. Because of the high resolution possible by the direct measurement technique, the enthalpy characteristic obtained readily and accurately discloses endothermic or exothermic reactions which may occur at specific temperatures. The specific heat may also be determined at any point by calculation of the slope of the curve at the desired temperature.

Although only the test procedure for an increase of enthalpy is outlined, it will be understood that the procedure may also be readily adapted to a decrease in enthalpy from an elevated temperature or to tests where the temperatures may be substantially below the ambient. In tests where the temperature is below ambient, the test procedure would be as outlined with the exception that the coolant system 12 is also operated. A constant rate of heat transfer will be effected by the correction circuit 25 as it will provide the desired temperature differential signal with the previous calibration, assuming that it had been calibrated for below ambient temperatures.

Test procedures requiring a decrease in enthalpy from elevated temperatures may also be readily accomplished with the following modifications of the previously described apparatus. in this mode of operation, heat is to be transferred from the container 40 and sample S to the shield 45 and the temperature of the shield must necessarily be maintained at a lower value than the temperature of the container. This is the reverse of the previous situation and the actual temperature differential signal will be of reversed polarity. It is, therefore, necessary to reverse the polarity of the voltage signal of the correction circuit which may be conveniently accomplished by a reversing relay 91 having its associated contacts connected in circuit with the battery 73, as indicated in FIGURE 4. For convenience of operation, a power switch 92 for connecting the relay to a suitable power source for energization thereof may be located on the temperature indicator 22. In the normal de-energized position, the movable contact arms 91a and 91b are positioned to connect the negative terminal of the battery 73 to the adjusting resistor 74 and the positive terminal to the end terminal 87 of the slide-wire resistance 70. Energization of the coil of relay 91 will effect a reversal in the terminal connections of the battery.

Although the temperature differential characteristic for decreasing enthalpy will have substantially the same shape as for an increase in enthalpy, the magnitude of the temperature differential for a constant rate of heat transfer will be greater at any given temperature. This difference in temperature differential results from the difference in the relative radiating surfaces of the shield 45 and the container 40. Adjustment of the output signal voltage of the correction circuit 23 to compensate for this difference could be accomplished by means of the adjusting resistor 74. However, for convenience, a second adjusting resistor 93 is provided as a replacement for resistor 74. The second adjusting resistor 93 would be initially set to provide the desired voltage for a decrease in enthalpy and thereby eliminates readjustment of the circuit for this change in the mode of operation.

To facilitate the interchange of the resistors 74 and 93, a single-pole, double-throw relay 94 is connected in circuit between the battery 73 and the resistances. The movable contact arm of relay 94 normally connects resistor 74 in circuit but connects resistor 93 in circuit when the operating coil thereof is energized. Since the resistors 74 and 93 are interchanged when the polarity of battery voltage is reversed, the coil of relay 94 is connected in shunt relationship to the coil of relay 91 for simultaneous operation therewith. Switch 92 will, therefore, actuate both relays 91 and 94.

The calorimetric apparatus of this invention and the method of operation is readily adaptable to test procedures where correlated data as to characteristics other than enthalpy may be desired. The constant rate of heat transfer permits testing where gas analysis is desired and has been previously discussed as an example.

It is readily apparent that the calorimetric apparatus and method of testing provided by this invention is capable of providing accurate information as to the enthalpy.

The testing procedure is simple and the apparatus is also of relatively simple construction and may be easily operated.

According to the provisions of the patent statues, the principles of the invention have been explained and have been illustrated and described. However, it is to be understood, that within the scope of the appended claims, the invention may be practiced otherwise than as specifically illustrated and described.

Having thus described this invention, what is claimed is:

1. A calorimetric apparatus for determining the enthalpy of a material comprising a container having a given heat characteristic in which a quantity of the material is disposed for testing; heat transfer means disposed in heat transferring relationship to said container and including control means for selectively, varying the heat transfer, said control means being responsive to a control signal; first temperature sensing means responsive to the temperature of said container and providing a first temperature signal related thereto; second temperature sensing means responsive to the temperature of said heat transfer means and providing a second temperature signal related thereto, said first and second temperature sensing means being interconnected whereby said first and second temperature signals provide a differential temperature signal related to the temperature differential between said container and said heat transfer means; reference signal means responsive to said first temperature sensing means providing a reference signal having a predetermined value at any given temperature which value is related to a predetermined temperature differential between said container and said heat transfer means to maintain a given, constant rate of heat transfer at any temperature; and detector means responsive to said reference signal and to said differential temperature signal to provide a control signal which is related to a deviation of the actual instantaneous temperature differential from the desired predetermined temperature differential at any given temperature, said detector means being operatively coupled with the control means of said heat transfer means to transmit the control signal thereto.

2. A calorimetric apparatus according to claim 1 wherein said heat transfer means includes a shield fabricated from a heat conducting material and disposed in substantially surrounding relationship to said container and means for maintaining said shield at a given temperature.

3. A calorimetric apparatus according to claim 2 wherein said last-mentioned means comprises an electric resistance heating element disposed in heat transmitting relationship to said shield.

4. A calorimeter apparatus according to claim 2 wherein said last-mentioned means comprises a coolant system disposed in heat transmitting relationship to said shield.

5. A calorimeter apparatus according to claim 1 wherein said reference signal means comprises a potentiometer apparatus adapted to provide a voltage reference signal over a selected temperature range which reference signal has a characteristic related to the temperature differential required to maintain a given rate of heat transfer.

6. A calorimeter apparatus according to claim 5 wherein said potentiometer apparatus includes a slide-wire resistance having a multiplicity of taps which are respectively connected to a voltage source and maintained at selected relative voltage, and a movable contact arm having an output terminal for said reference signal, said contact arm being adapted to be displaced in response to said first temperature signal.

7. A calorimetric apparatus for determining the enthalpy of a material comprising a material container in which a given quantity of the material to be tested is disposed, heat transfer means disposed in heat transferring relationship to said container, control means operatively connected with said heat transfer means for maintaining a constant rate of heat transfer therebetween in response to a control signal, and a control system for providing a control signal to said control means, said control system including temperature sensing means responsive to a temperature differential between said heat transfer means and said material container and to the temperature of said material container for providing a first input signal related to the instantaneous temperature differential and a second input signal indicative of the desired temperature differential required for a predetermined constant rate of heat transfer at any specific temperature, and current means responsive to said first and second input signals to provide a related control signal to said control means.

8. A calorimetric apparatus for determining the enthalpy of a material comprising a material container in which a given quantity of material is deposited, heat transfer means disposed in heat transferring relationship to said container, control means responsive to a control signal and operative on said heat transfer means for controlling the transfer of heat relative thereto at a predetermined constant rate, a control system for providing a control signal including temperature sensing means responsive to a temperature differential between said heat transfer means and said container and to the temperature of said container to provide a first input signal related to the temperature differential and a second input signal which is a function of the container temperature and indicative of the desired temperature differential required for a constant rate of heat transfer at any specific temperature, and circuit means responsive to said first and second input signals to provide a related control signal to said control means, and means providing a readout of a time-temperature function which is related to the enthalpy.

9. The method of determining the enthalpy of a sample of material comprising the steps of positioning the material in heat transferring relationship to a controllable heat transfer means, providing a reference electrical signal related to a predetermined temperature differential characteristic between the sample and the heat transfer means at any given temperature for a constant rate of heat transfer, determining the temperature differential between the heat transfer means and the sample at any given temperature and providing a related electrical temperature differential signal, comparing the temperature differential signal with the reference signal to form a control signal and controlling the heat transfer means with the resulting control signal to maintain the predetermined temperature differential at any given temperature, and timing the interval of heat transfer at a constant rate to determine the change in enthalpy.

References Cited
UNITED STATES PATENTS

| | | | |
|---|---|---|---|
| 3,267,728 | 8/1966 | Solomons | 73—190 |
| 3,314,288 | 4/1967 | Sherwin | 73—190 |

RICHARD C. QUEISSER, *Primary Examiner.*

E. SCOTT, *Assistant Examiner.*